United States Patent
Nowak et al.

(10) Patent No.: US 9,628,625 B2
(45) Date of Patent: Apr. 18, 2017

(54) SYSTEM AND METHOD TO USE PREDICTED AGENT STATE TO OPTIMIZE SELECTION STRATEGY

(71) Applicant: Avaya Inc., Santa Clara, CA (US)

(72) Inventors: Dawid Nowak, Dublin (IE); Tony McCormack, Galway (IE); Joseph Smyth, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/554,143

(22) Filed: Nov. 26, 2014

(65) Prior Publication Data

US 2016/0150087 A1    May 26, 2016

(51) Int. Cl.
*H04M 3/00* (2006.01)
*H04M 5/00* (2006.01)
*H04M 3/523* (2006.01)

(52) U.S. Cl.
CPC ........ *H04M 3/5238* (2013.01); *H04M 3/5235* (2013.01)

(58) Field of Classification Search
CPC ............. H04M 3/5183; H04M 3/5232; H04M 2203/40; H04M 2203/407; H04M 2203/408
USPC .............. 379/265.1, 265.02, 265.05, 265.01, 379/265.13, 265.11
See application file for complete search history.

(56) References Cited

U.S. PATENT DOCUMENTS

| | | | |
|---|---|---|---|
| 5,206,903 A | 4/1993 | Kohler et al. | |
| 5,828,747 A | 10/1998 | Fisher et al. | |
| 5,905,793 A | 5/1999 | Flockhart et al. | |
| 5,982,873 A | 11/1999 | Flockhart et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,535,600 B1 * | 3/2003 | Fisher | H04M 3/5233 379/265.02 |
| 8,976,953 B2 * | 3/2015 | Peterson | H04M 3/5141 379/265.02 |
| 2003/0156704 A1 * | 8/2003 | Dezonno | H04M 3/5158 379/265.1 |
| 2014/0095693 A1 * | 4/2014 | Apte | H04L 67/1008 709/224 |

* cited by examiner

*Primary Examiner* — Thjuan K Addy

(57) ABSTRACT

System and method to improve self-service operation in a contact center, the method including: determining a characteristic of the new customer contact; determining a characteristic of an existing customer contact; determining a communication delay latency between an assignment engine and a contact center agent; determining a time to assign the new customer contact to the contact center agent, wherein the time to assign is made in a predetermined amount of time in advance of receiving a ready indication from the contact center agent, the predetermined amount of time determined from the communication delay latency.

19 Claims, 7 Drawing Sheets

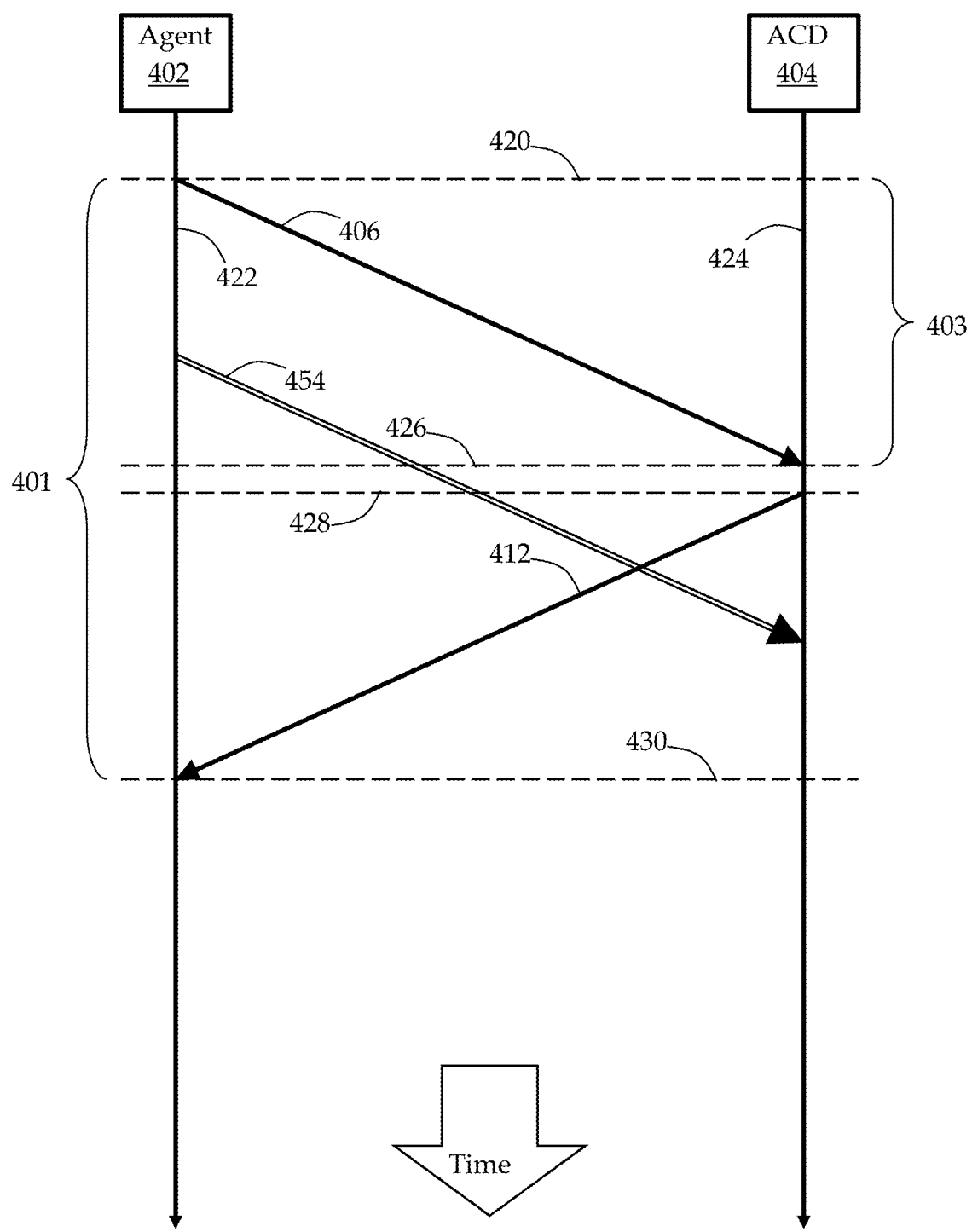

600

SYSTEM AND METHOD TO USE PREDICTED AGENT STATE TO OPTIMIZE SELECTION STRATEGY

BACKGROUND

Field

Embodiments of the present invention generally relate to improving operation of a contact center, and, in particular, to a system and method for improved time of assigning work by accounting for communication system latency.

Description of Related Art

For conventional contact center systems, status of system resources (e.g., the agents) is monitored in order to use the monitored status for assignment decisions by the contact center routing engine. Assignment decisions would include assigning specific customer contacts or other pieces of work to specific agents. Conventionally, system resources are located relatively close to the routing engine, either in a physical sense or a communication delay sense. Therefore, conventional systems assume that the routing engine is acting upon information that is correct at the instant of action. Conventional systems do not recognize that such a delay exists, or assume that if such a delay exists that it is not a significant delay. Such an assumption becomes less valid as the delay between monitoring and acting increases, leading to uncertainty and incorrectness in routing decisions.

Therefore, what is needed is a contact center routing engine that takes into account delays between monitoring the status of system resources and the usage of the status by the routing engine.

Therefore, a need exists to provide improved self-service operation of a contact center, and, in particular, to a system and method to account for communication system latency, in order to provide improved customer satisfaction, and ultimately higher sales and lower operational cost.

BRIEF SUMMARY

Embodiments of the present invention generally relate to improving operation of a contact center, and, in particular, to a system and method for improved time of assigning work by accounting for communication system latency in light of the probabilities associated with various estimates.

In one embodiment, a method to improve operation in a contact center includes: determining a characteristic of the new customer contact; determining a characteristic of an existing customer contact; determining a communication delay latency between an assignment engine and a contact center agent; determining a time to assign the new customer contact to the contact center agent, wherein the time to assign is made in a predetermined amount of time in advance of receiving a ready indication from the contact center agent, the predetermined amount of time determined from the communication delay latency.

In one embodiment, a system to improve self-service operation in a contact center may include: a customer contact module configured to determine a characteristic of the new customer contact; a work analysis module configured to determine a characteristic of an existing customer contact; a latency analyzer configured to determine a communication delay latency between an assignment engine and a contact center agent; a processor coupled to a memory, the processor configured to determine an assignment time to assign the new customer contact to the contact center agent, wherein the time to assign is made in a predetermined amount of time in advance of receiving a ready indication from the contact center agent, the predetermined amount of time determined from the communication delay latency; and a communication module configured to transmit the assignment of the new customer contact to the contact center agent at the determined assignment time.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 4B is an anomalous timeline of new work assignment in accordance with an embodiment of the present disclosure;

Figure 1:
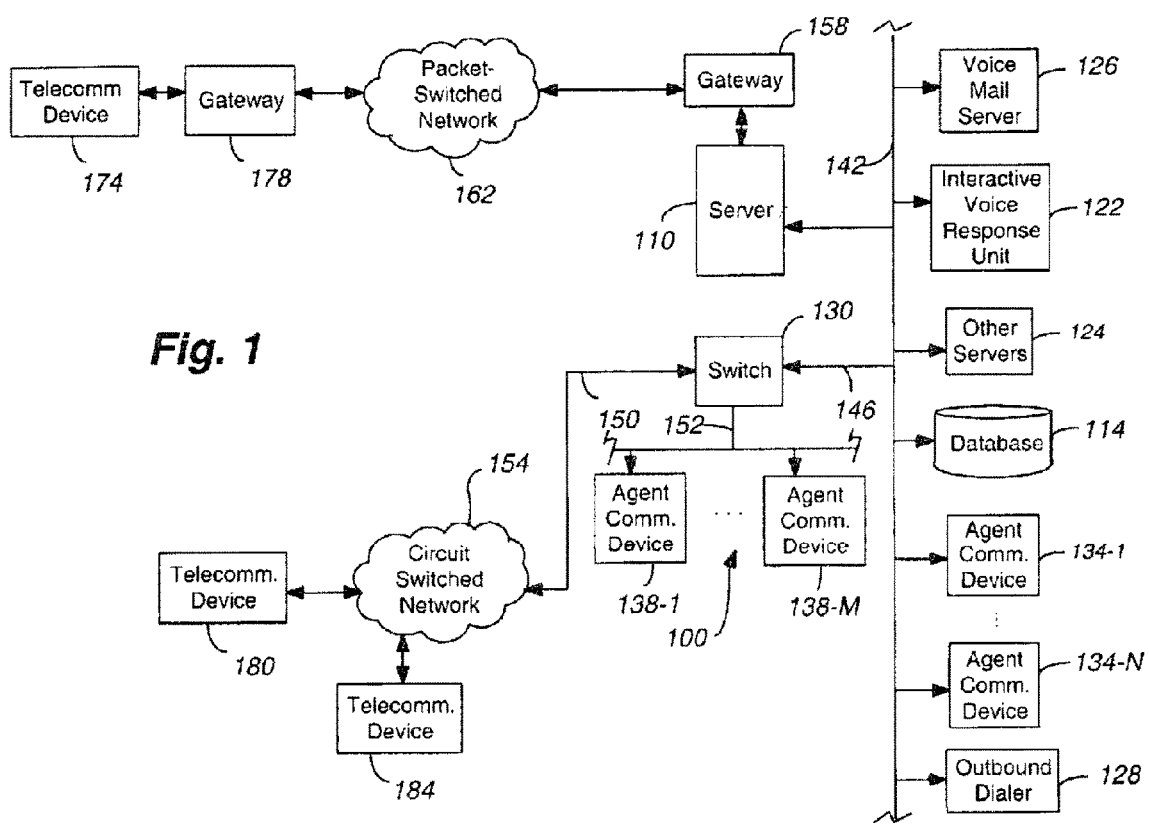
FIG. 1 is a block diagram depicting a contact center in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize self-service and agent-assisted features of a contact center.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like. The term "server" where used may refer to an individual server or a cluster of servers, unless a different meaning is clearly indicated.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible, non-transitory storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The time delay between the time the resource is monitored and when the monitored status is used by the routing engine may be referred to as latency or latency period. Any change in resource status during the latency period has a possibility to cause an unintended routing decision by the routing engine, and thus the possibility of such a change in status causes uncertainty in the correctness of the assignment decisions.

Referring now to FIG. 1, which is a block diagram depicting a contact center in accordance with an embodiment of the present invention, there is provided a contact center 100. The contact center generally comprises a central server 110, a set of data stores or databases 114 containing contact or customer related information and other information that can enhance the value and efficiency of the contact, and a plurality of servers, for example, a voice mail server 126, an Interactive Voice Response unit (IVR) 122, and other servers 124, an outbound dialer 128, a switch 130, a plurality of working agents operating packet-switched (first) telecommunication devices 134-1 to N (such as, but not limited to, computer work stations or personal computers), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The gateway 158 may comprise Avaya Inc.'s, G250™, G350™, G430™, G450™, G650™, G700™, and IG550™ Media Gateways and may be implemented as hardware such as, but not limited to, via an adjunct processor (as shown) or as a chip in the server.

The first telecommunication devices 134-1, . . . 134-N are packet-switched device, and may include, for example, IP hardphones, such as the Avaya Inc.'s, 1600™, 4600™, and 5600™ Series IP Phones™; IP softphones running on any hardware platform such as PCs, Macs, smartphones, or tablets, (such as Avaya Inc.'s, IP Softphone™); Personal Digital Assistants or PDAs; Personal Computers or PCs, laptops; packet-based H.320 video phones and/or conferencing units; packet-based voice messaging and response units; and packet-based traditional computer telephony adjuncts.

The second telecommunication devices 138-1, . . . 138-M are circuit-switched. Each of the telecommunication devices 138-1, . . . 138-M corresponds to one of a set of internal extensions, for example, Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner.

The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention do not require any particular type of information transport medium between switch or server and first and second telecommunication devices, i.e., embodiments of the present invention may be implemented with any desired type of transport medium as well as combinations of different types of transport media.

The packet-switched network 162 of FIG. 1 may comprise any data and/or distributed processing network such as, but not limited to, the Internet. The network 162 typically includes proxies (not shown), registrars (not shown), and routers (not shown) for managing packet flows. The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol or SIP compatible and may include interfaces for various other protocols such as, but not limited to, the Lightweight Directory Access Protocol or LDAP, H.248, H.323, Simple Mail Transfer Protocol or SMTP, IMAP4, ISDN, E1/T1, and analog line or trunk.

It should be emphasized the configuration of the switch, server, user telecommunication devices, and other elements as shown in FIG. 1 is for purposes of illustration only and should not be construed as limiting embodiments of the present invention to any particular arrangement of elements.

In handling incoming calls, a contact center is capable of exchanging Internet Protocol (IP) data packets, Session Initiation Protocol (SIP) messages, Voice over IP (VoIP) traffic, and stream-related messages (e.g., Real Time Streaming Protocol [RTSP] messages, etc.) with calling endpoints such as endpoint 202. As those who are skilled in the art will appreciate, after reading this specification, contact center 210 is capable of communicating by using other protocols, in some alternative embodiments.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to route, and then forward the contact to a specific contact center resource such as, but not limited to, the IVR unit 122, the voice mail server 126, the instant messaging server, and/or first or second telecommunication device 134, 138 associated with a selected agent. The server 110 distributes and connects these contacts to telecommunication devices of available agents, based on the predetermined criteria noted above.

When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In the CRM environment, both real-time and non-real-time contacts may be handled and distributed with equal efficiency and effectiveness. The server 110 may use a work assignment algorithm that, for example, does not use a queue. In any event, the contact may have associated or "known" contact information. This contact information may include, for example, how long the contact has been waiting, the contact's priority, the contact's media channel, the contact's business value, etc. The contact may be handled based on such known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as, but not limited to, a logic circuit), or a combination thereof.

The contact center 100, in one configuration, includes an automated instant messaging server as another server 124. In such an embodiment, when a customer initiates contact with the contact center 100 using instant messaging, a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., IP address, Media Access Control (MAC) address, telephone number, mobile-device identifier, and the like) of the customer's communication device with an electronic address (e.g., IP address, MAC address, telephone number, mobile-device identifier, and the like) of the agent's communication device in a manner similar to that used for a voice call.

The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, the server 110 instructs the instant messaging server to redirect the instant messaging conversation to that available agent's communication device 134-1 . . . N. The server 110 routes, substantially in real-time, subsequent instant messages from the agent's communication device to the customer's communication device and from the customer's communication device to the agent's communication device.

Figure 2:
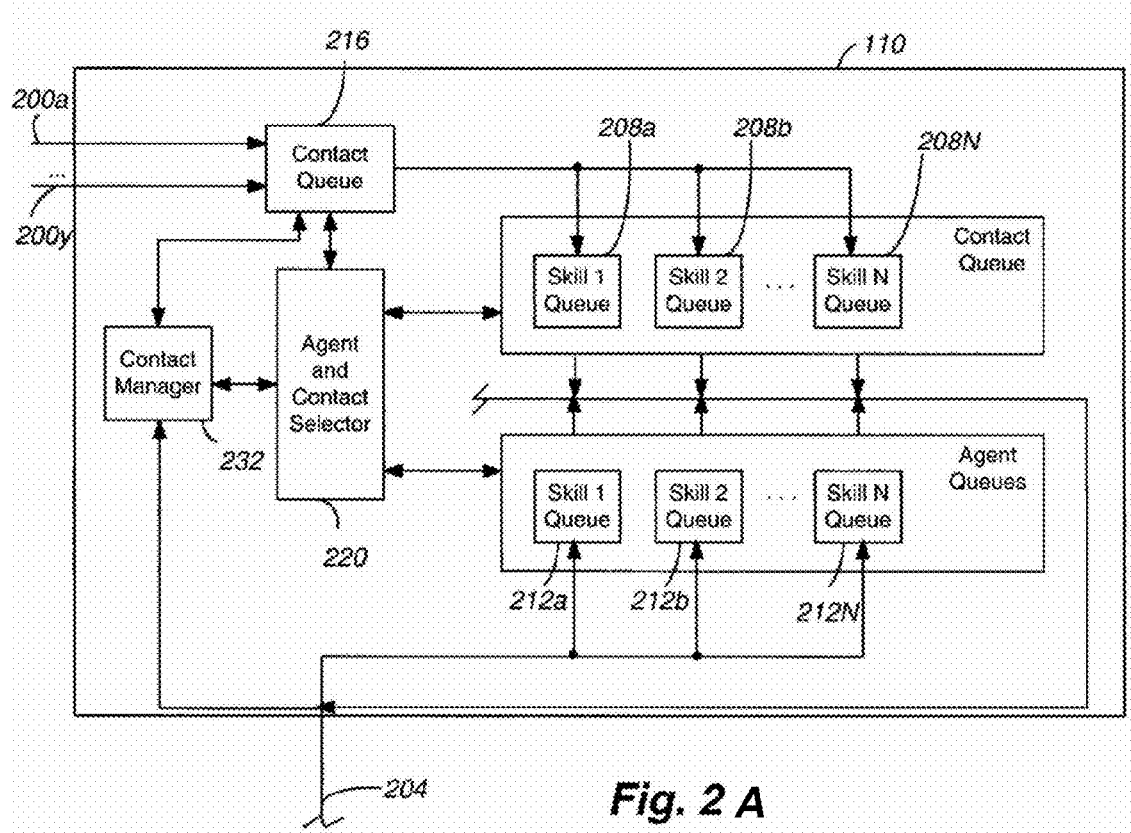
FIG. 2A is a system level block diagram depicting an administrator server in accordance with an embodiment of the present invention.
FIG. 2B is a block diagram of a contact manager in accordance with an embodiment of the present disclosure.

Referring to FIG. 2A, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a Basic Call Management System (BCMS) (not shown) and a Call Management System (CMS) (not shown) that gathers call records and contact-center statistics for use in generating contact-center reports.

The switch 130 and/or server 110 can be any computer and/or telecommunication architecture for directing contacts to one or more telecommunication devices to be serviced by one or more preferred agents. Illustratively, the switch and/or server 110 can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Private-Branch Exchange (PBX)-based ACD system; MultiVantage™ PBX, CRM Central 2000 Server™; Communication Manager™, and/or S8300™ media server.

Typically, the switch/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (NIC) (not shown) to provide services to the serviced telecommunication devices. Other types of known switches and servers are well known in the art and therefore not described in detail herein.

Referring again to FIG. 2A, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and are either enqueued in individual ones of the contact queues 208a-n in their respective orders of priority or are enqueued in different ones of a plurality of contact queues that correspond to a different priority.

Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill. Each one of which corresponds to a different expertise level. Although depicted for clarity sake as skills of the agents, these queues equally may represent agent attributes or some other parameters such that the agents are matched up with contacts on a preferred agent basis.

In one embodiment of the present invention, as depicted in FIG. 2A, a contact vector (queue) 216 is included among the control programs in the server 110. Contacts incoming to the contact center may be assigned by contact vector 216 to different contact queues 208a-n based upon a number of predetermined criteria, including customer identity, customer needs, contact center needs, current contact center queue lengths, customer value, and the agent skill, attributes or other parameters required for the proper handling of the contact and being designated as a preferred agent for a particular contact.

Agents who are determined to be preferred agents for a given contact, and are available for handling said contacts are assigned to agent queues 212a-n based upon the skills or attributes they possess. An agent may have multiple skills, attributes or other parameters, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in Communication Manager Communications System Generic 3. Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903, both incorporated herein by reference.

Embodiments in accordance with the present disclosure add a Bayesian predictive feature contact center processes so that the contact center system can dynamically alter the estimated time of completion of a call and send a new work assignment in advance of receiving a ready indication from the agent More particularly, embodiments are able to estimate dynamically a level of agent busyness existing within a contact center, and correspondingly adjust a time in advance for when new work is assigned to the agent. An acceptable probability that an agent will be ready for new work even though no "ready" indication has been received yet may vary from one contact center operator to another depending upon, e.g., business needs of the contact center operator.

Figure 2B:
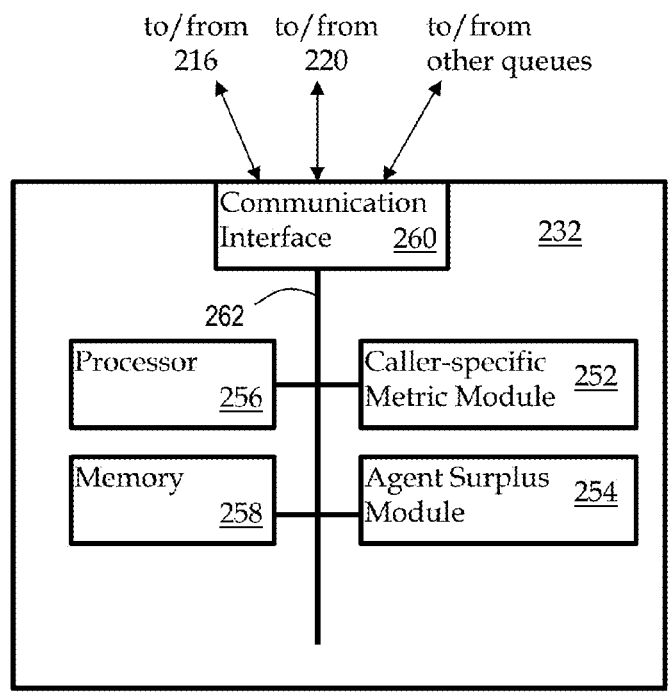

FIG. 2B illustrates a block diagram of a contact manager module 232 in accordance with an embodiment of the present disclosure. Contact manager 232 may include a customer-specific metric module 252 that monitors the progress of respective customer communications, and an agent surplus monitor module 254 that calculates a current level of agent surplus, e.g., based upon queue length and which agents are idle. Contact manager 232 may include a processor 256 coupled to a memory 258 and coupled to communication interface(s) 260, in order to implement the processes described herein. Components of contact manager are interconnected via an internal communication path 262.

Processor 256 may be configured (e.g., through use of computer code and/or appropriate sensor interfaces) to detect a level of a customer-specific metric through use of customer-specific metric module 252 and monitoring of queues 208, 212, and a level of agent surplus through use of agent surplus monitor module 254. Processor 256 may then determine which sub-domain of operational domain that the contact center 100 is currently operating in with respect to the specific customer being monitored.

Conventionally, system resources are located relatively close to the routing engine, either in a physical sense or a communication delay sense. Therefore, conventionally there is relatively little latency, with little or no change in status to be expected during this latency period, and thus little or no uncertainty in the correctness of the assignment decisions. Conventional systems either do not recognize the existence of latency, or assume that the latency period and resulting uncertainty caused by the latency period are negligible. Such assumptions become less accurate as latency becomes greater, e.g., in a contact center with globally-dispersed resources having inherently more communication delay, or a contact center with resources who can log in from remote locations through secure connections that introduce additional latency. Furthermore, as the number of contact center resources increases, then statistically it will be expected that some agents will have a change in status during the latency period. Therefore, globally-dispersed contact centers, there is a non-negligible probability that information will be stale, e.g., that the resource information used by the assignment engine as a datum to make assignments of work to resources will not represent the resource information at the instant of assignment of the work. Resource information may include metrics such as whether the agent is busy, how long is the agent's queue, the current customer being serviced by the agent, and so forth.

Figure 3:
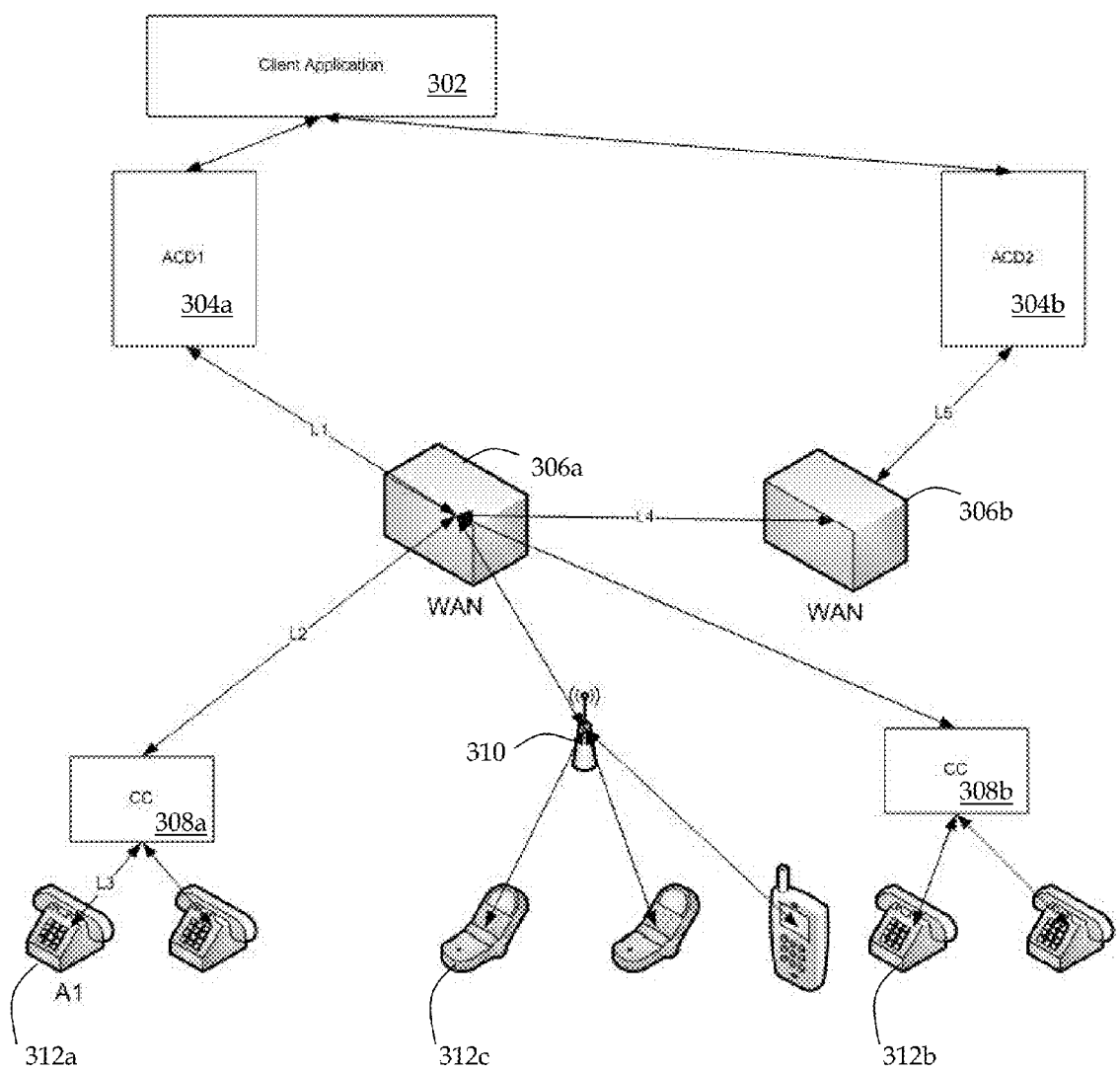
FIG. 3 is a block diagram of a widely-dispersed contact manager system in accordance with an embodiment of the present disclosure.

An embodiment 300 of an architecture of a widely-dispersed contact center is illustrated in FIG. 3. Embodiment 300 includes a client application 302, which operates in the contact center. Client application 302 may execute on a server within the contact center (e.g., server 110 and/or server 124), and may perform high-level functions such as servicing customer inquiries, both before and after the customer inquiry has been assigned to a specific agent. Client application 302 may gather information about the customer contact (e.g., an identity of the customer, a reason for calling, an affiliation, a prior history, etc.) for use in making a routing decision to a specific agent.

Client application 302 may be communicatively coupled to one or more automatic contact distributors (ACD) 304a, 304b. An individual but unspecified ACD may be referred to as ACD 304. A group of one or more of the ACDs may be referred to collectively as ACDs 304. ACDs 304 interface with client application 302, e.g., by exchanging information about the customer contact in order to make a routing decision to a specific agent. Multiple ACDs 304 may be provided in order to service assignments for a respective group of geographically-related agents, or to provide a fault-tolerant architecture. For example, ACD 304a and ACD 304b may reside on different continents. Embodiment 300 is operating in an active backup mode, such that one of the ACDs (e.g., ACD 304a) is acting as a primary ACD, and the other ACD (e.g., ACD 304b) is acting as an active backup ACD. In active backup mode, if the active ACD and the backup ACD arrive at different results, the result of the active ACD will be preferred ACDs 304a, 304b are further coupled to a respective wide-area network (WAN) 306a, 306b. An individual but unspecified WAN may be referred to as WAN 306. A group of one or more of the WANs may be referred to collectively as WANs 306. WANs 306 provide communication links with various distributed (i.e., local) contact centers 308a, 308b, or may provide communications links to publicly-accessible communication terminals directly (e.g., a voice over IP (VoIP) phone not illustrated in FIG. 3) or indirectly via communication infrastructure such as cell tower 310. Local contact centers 308a, 308b operate to concentrate traffic and provide access to agent phones 312. Additional local contact centers 308 may be provided to service clusters of agent phones 312, in which each cluster may be geographically-dispersed from another cluster. Embodiments in accordance with the present disclosure move a decision making process from local contact centers 308a, 308b to ACD 304a, 304b, with ACD 304a, 304b having a more global view of agent status but having an inherent latency in receiving agent status updates.

Embodiment 300 further includes interfaces to various communication terminals 312a, 312b, 312c. Communication terminal 312a represents one or more terminals communicatively coupled to a first local contact center (CC) such as CC 308a. An example of the coupling is a private branch exchange (PBX). Communication terminal 312b represents one or more terminals communicatively coupled to a second local CC such as CC 308b. Communication terminal 312c represents one or more terminals that are communicatively coupled either directly to a WAN such as WAN 306a, or may be communicatively coupled to network infrastructure such as cell tower 310, and from there to a WAN. Even though terminals 312c are not illustrated as being directly coupled to a contact center, they may be available to receive and service contacts assigned by a contact center. For example, terminal 312 may be operated by a resource (e.g., an agent) who works remotely (e.g., from home), and who is available to receive work assignments from a contact center as if the user of terminal 312c were instead using one of terminal 312a or 312b. The phone number or other contact information of terminal 312c will recorded by one of local contact centers 308 for use in assigning work to an agent at terminal 312c.

FIG. 3 illustrates and labels certain communication links of embodiment 300. The labeling will be useful when referring to latency scenarios discussed below. Link L1 is the link between WAN 306a and ACD 304a. Link L2 is the link between WAN 306a and local CC 308a. Link L3 is the link between local CC 308a and communication terminal 312a. Link L4 is the link between WAN 306a and WAN 306b. Link L5 is the link between WAN 306b and ACD 304b.

The widely-dispersed nature of FIG. 3 introduces significant latency. Each network link illustrated in FIG. 3 will introduce delay due to the physical distance between the components and due to the combined effects of communication link transfer speed and processing power of network components. As the length of the delay increases, the probability increases that an ACD will have stale information about true agent state.

For example, suppose that the delay associated with link Li is denoted as $D_{Li}$. An event or status message to indicate that an agent operating terminal 312a has become ready will be propagated to all ACDs 304. The time delay this message will take to propagate to ACD 304a is $D_{L1}+D_{L2}+D_{L3}$. In contrast, the time delay this message will take to propagate to ACD 304b is $D_{L3}+D_{L2}+D_{L4}+D_{L5}$. If both communication terminal 312a and ACD 304a are located on the East Coast of the U.S., the delay from terminal 312a to ACD 304a may be less than about 0.1 seconds each way. However, if communication terminal 312a is located on the East Coast of the U.S. and ACD 304b is located in Europe, the delay from terminal 312a to ACD 304b may reach about 0.5 seconds or more each way.

Figure 4A:
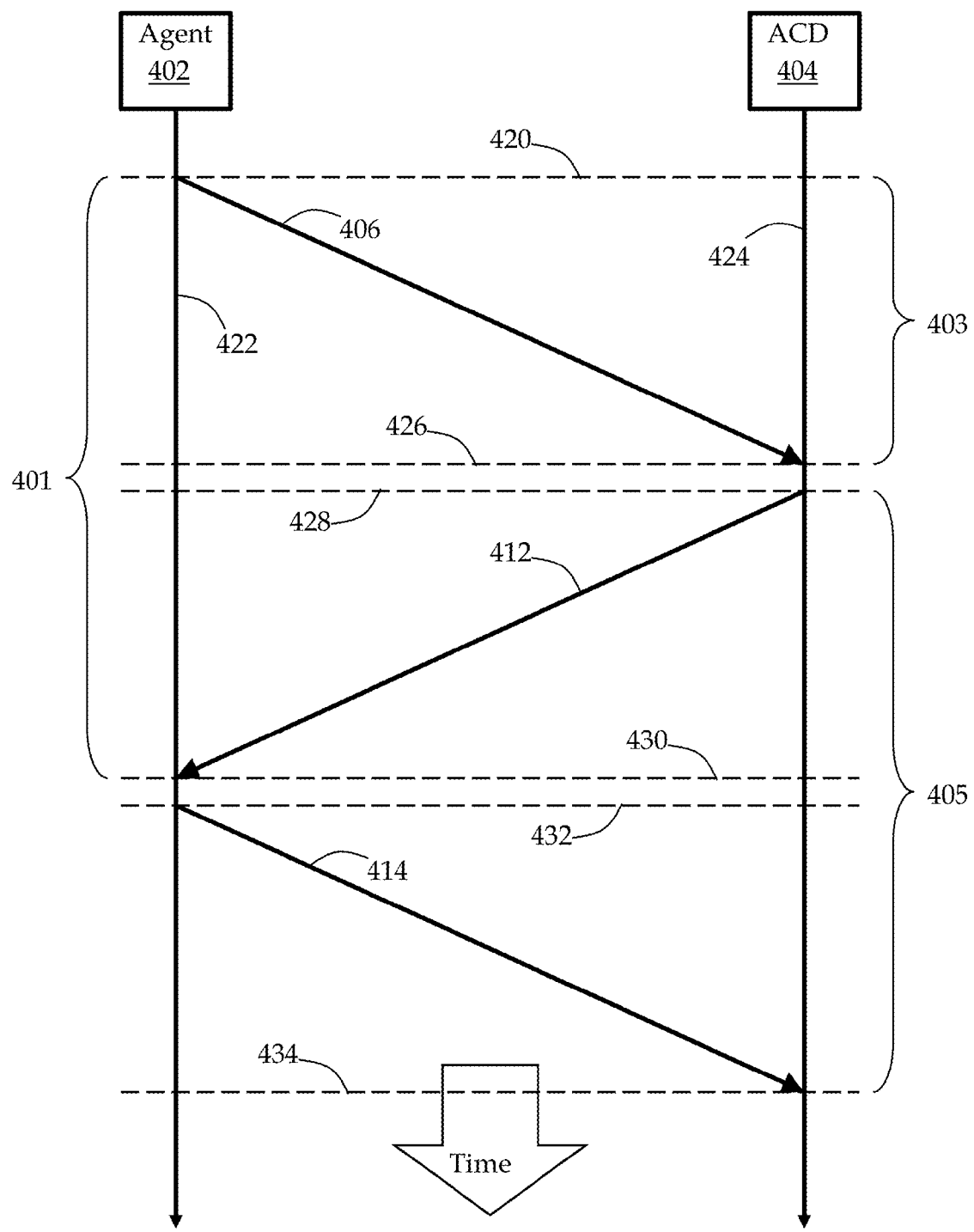
FIG. 4A is a timeline of new work assignment in accordance with an embodiment of the present disclosure

FIG. 4A illustrates a message exchange 400 between an agent terminal 402 and an ACD 404, in accordance with an embodiment of the present disclosure. FIG. 4A may correspond to messaging though embodiment 300 of the network illustrated in FIG. 3. Time is illustrated as advancing from top to bottom of FIG. 4A. A timeline 422 is illustrated beneath agent terminal 402, and a timeline 424 is illustrated beneath ACD 404. The dotted lines of FIG. 4A represent simultaneous times or events on timelines 422, 424 according to a global reference clock (e.g., Universal Coordinated Time (UTC), atomic references, and so forth). Latency is illustrated as the time difference between the time of transmission of a message from either agent terminal 402 or ACD 404, and the time of receipt of the message at ACD 404 or agent terminal 402, respectively. Although latency is illustrated in FIG. 4A as being symmetrical, symmetry is not necessarily true in general. For example, some communication links (e.g., links based on cable modem technology) may have a faster transmission speed in a downlink direction compared to an uplink direction.

Message exchange 400 of FIG. 4A may begin by the occurrence at global time 420 of the completion of a work by the agent at agent terminal 402. Agent terminal 402 may be a "dumb" terminal without a local queueing capability for work assignments. Substantially simultaneously, agent terminal 402 sends message 406 to ACD 404 in order to indicate that agent terminal 402 has become idle and is ready to receive another assignment. Because of uplink latency, message 406 is received by ACD 404 at later time, i.e., at global time 426. The time delay between sending message 406 by agent terminal 402 and receiving message 406 by ACD 404 is illustrated as interval 403, which represents a period of time lost to ACD 404 due to uplink latency because ACD 404 has not yet received notification that the agent at terminal 402 is in an idle state.

Once ACD 404 receives message 406, and expends processing time to interpret message 406 and to recognize that the agent at terminal 402 is idle and to formulate an appropriate response, message 412 is sent to terminal 402 at global time 428 in order to assign a new call to the agent at terminal 402. Because of downlink latency, message 412 is received by terminal 402 at global time 430. The time delay between sending message 406 by agent terminal 402 and receiving message 412 by agent terminal 402 is illustrated as interval 401, which represents a period of time lost to agent terminal 402 due to downlink latency between agent terminal 402 and ACD 404.

Once terminal 402 receives message 412 at global time 430 with a new assignment, and expends processing time to interpret message 412 and to recognize that a new assignment is being assigned and to formulate an appropriate response, terminal 402 will send an acknowledgment message 414 at global time 432 to ACD 404. Acknowledgment message 414 will interpreted by ACD 404 as meaning that the agent at terminal 402 is no longer available for a new assignment, until further notice.

FIG. 4A illustrates interval 401, from transmission of message 406 to the receipt of message 412, representing a period of time that an agent at terminal 402 is in an idle state due to latency. FIG. 4A further illustrates interval 403, representing a period of time from global time 420 to receipt of message 406 lost to ACD 404 due to latency because ACD has not yet received notification that the agent at terminal 402 is in an idle state. FIG. 4A further illustrates interval 405, from transmission of message 412 to receipt of message 414, representing a period of time during which an agent at terminal 402 is in an unknown state of utilization due to latency. Because of uplink latency, message 414 is not received by ACD 404 until global time 434.

Message exchange 400 represents receiving status reports and assigning work in its basic form. As additional messages may be added (e.g., further queries, further status reporting, handshaking, etc.), additional latency delays may be incurred in order to ensure that the call was delivered to the resource successfully. Latency delays as illustrated in FIG. 4A can lead to two major problems:

First, ACD 404 may not have a correct view of resources and may route a call to a resource such as agent terminal 402 in wrong state. For example, agent terminal 402 may decide to go on the break and activate a NotReady notification. This situation is illustrated in FIG. 4B, in which notification message 454 is sent to ACD 404. However, because uplink latency causes ACD 404 to receive message 454 after ACD 404 has sent message 412, message 412 is based upon stale information. Ultimately, basing assignments on stale information will result in calls being rejected, worse user experience and decreased utilization of available resources.

Second, there may be considerable amount of time where agents are idle due to network latency. For small CCs and CCs where call duration is relatively long in comparison to the call setup phase this might not be a problem but for modern large and distributed CCs this could be a problem especially when other much more short lived media are in use.

Embodiments in accordance with the present disclosure address the problem illustrated by FIGS. 4A-4B by use of a Bayesian estimator to predict the correct state of the agent in advance based on factors related to known network and agent characteristics. Such factors may include a current known state of the agent, a known or estimated network latency between the agent and the ACD, an average duration of the call for a given agent, knowledge of quality of previous predictions, and so forth. Factors may further include probability distribution functions of estimates of such factors. A contact center in accordance with an embodiment of the present disclosure may actively measure and collect data about network latency between agents and ACDs.

Knowledge of statistics related to previous contacts from this customer, or from similar subject matter contacts from other customers, etc., may be determined by querying internal or external databases. An example of an internal database is database 114 of FIG. 1.

Such a Bayesian estimator would give an ACD a mechanism to optimize its routing strategy. Assuming that a calculated Bayesian probability is relatively high, an ACD may send a new call to an Agent before actual confirmation that agent has finished his call and thus reduce the impact of network latency.

The level of confidence needed to use predicted agent state could be adjusted based on the cost/benefit analysis of the call and current state of other agents with similar capabilities. For example, for calls where cost of rejecting a call is low, potentially there could be more agents available to handle the call, or the call could be handled on a different channel, or the rules could be relaxed. For important calls a very high level of confidence would be required in order to use predicted resource state.

Figure 5:
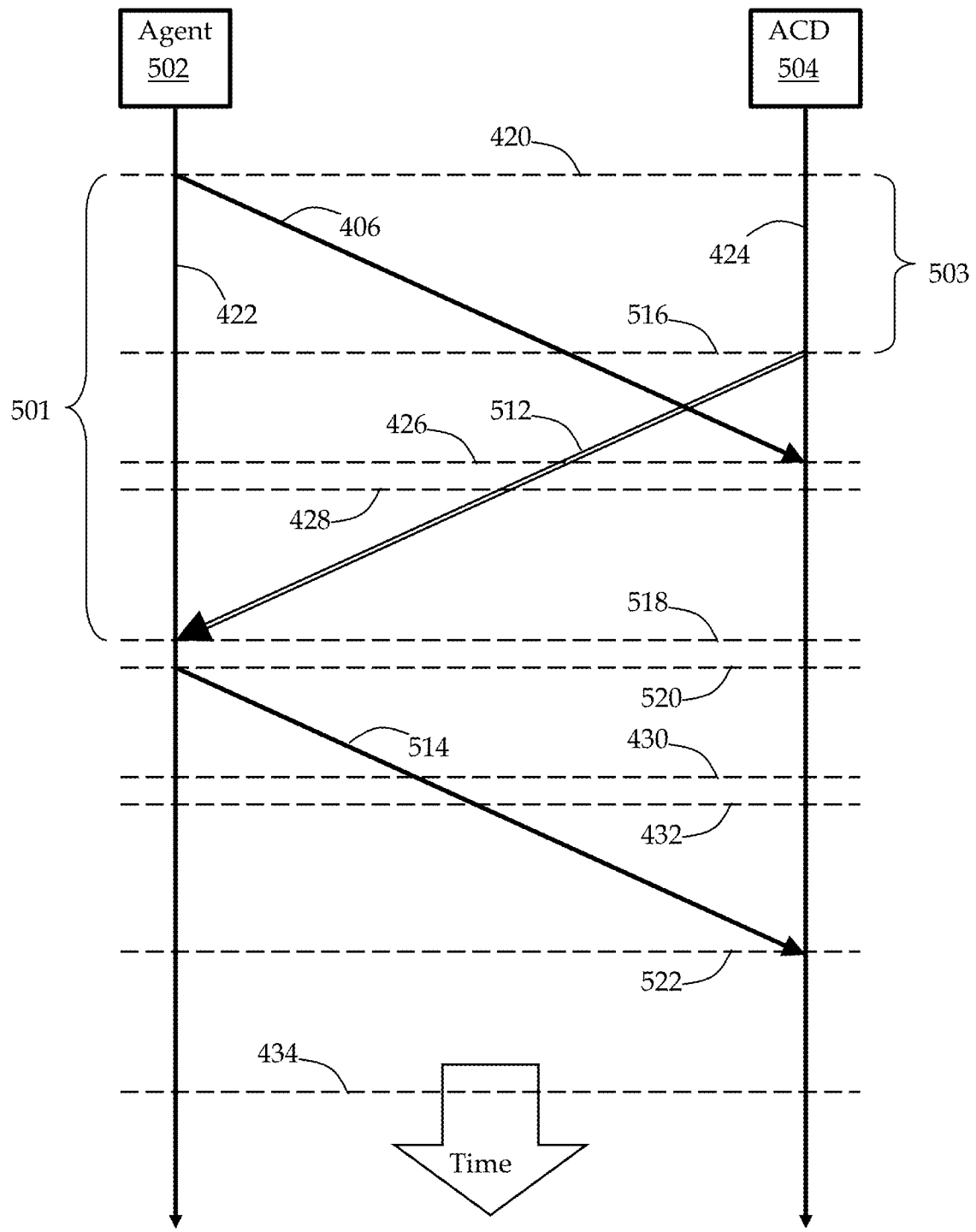
FIG. 5 is an improved timeline of new work assignment in accordance with an embodiment of the present disclosure.

FIG. 5 illustrates a message exchange 500 between agent terminal 502 and ACD 504 in accordance with an embodiment of the present disclosure. Message exchange 500 is similar to message exchange 400, and similar messages and similar global times are assigned reference designators accordingly. In contrast to message exchange 400, ACD 504 includes a Bayesian estimator. The effect of the Bayesian estimator is seen in FIG. 5 by the transmission by ACD 504 of message 512 at global time 516. Message 512 includes a new assignment for agent terminal 502, and is received by agent terminal 502 at global time 518. Notably, global time 516 precedes global time 428, which was the time that a new assignment was sent to agent terminal 402 without the benefit of Bayesian estimation. Agent terminal 502 at global time 520 then sends acknowledgement message 514 to ACD 504.

Comparing FIG. 5 to FIG. 4A, the delay periods 501 and 503 are smaller than the corresponding delay periods 401, 403, respectively. This illustrates less time is wasted due to latency.

Figure 6:
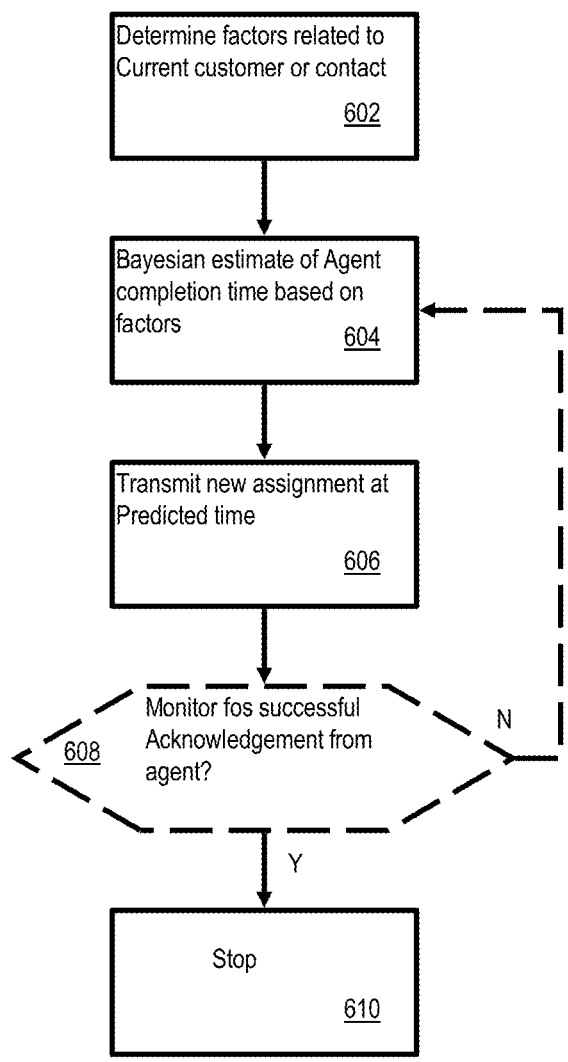
FIG. 6 is a process flow in accordance with an embodiment of the present disclosure.

FIG. 6 illustrates a process 600 in accordance with an embodiment of the present disclosure. Process 600 begins at step 602, at which factors related to a customer contact are determined. These are factors that may be used for the Bayesian estimation. The factors may be determined when the customer contact first arrives at the contact center, or during progress of the call, or a combination of the two. The factors may be updated during the progress of the call. Factors may include importance of the customer, importance of the call (e.g., in terms of commercial potential), difficulty of subject matter affecting the expected duration of the call, customer's reason for calling that may affect the expected duration of the call, and so forth.

Message latency may be known in advance, for example, by the sending party including a time-of-transmission field with the transmitted message. The receiver will be able to measure its own received time accurately, therefore the latency to the receiver can be determined. The receiver's latency can be transmitted to the transmitter (e.g., as a message field in an overhead message, or a new in-band message field, or via a separate communication channel, etc.). The latency is expected to change slowly as long as network topology does not change. However, changes in network topology (e.g., failure in a communication link or a transmission element) may cause an abrupt change (positive or negative) in the latency.

Next, process 600 proceeds to step 604, at which the factors from step 602 are converted to Bayesian estimates. The estimates are Bayesian at least because the statistical confidence of the estimates will change (unusually becoming smaller) depending upon the progress of the call. If new problems or facts are uncovered during the call, the Bayesian confidence may degrade. An improved estimate has a smaller variance and a degrade estimate has a larger variance. Step 604 may include a waiting step, in order for the Bayesian confidence to become sufficiently high. The Bayesian confidence is sufficiently high when the probability that the remaining time of the call is less than the latency time to transmit a new assignment to the agent terminal. Once the Bayesian confidence is sufficiently high, step 604 may end.

Next, process 600 proceeds to step 606, at which ACD 504 transmits a new assignment to agent terminal 502 at a time predicted during step 604.

Next, process 600 proceeds to optional decision step 608, at which ACD 504 monitors for a successful acknowledgement from agent terminal 502. A successful acknowledgement will indicate that the Bayesian time estimate from step 604 was sufficiently accurate, e.g., that agent terminal 502 was able to begin the new work item when assigned, or that agent terminal 502 was able to place the new work request in queue until agent terminal was able to begin work on it. Decision step 608 is optional if agent terminal 502 has a queueing capability to store a new work request until the current work request is completed. Optionally, if no acknowledgement is received by ACD 504 from agent terminal 502 within a configurable timeout period, control of process 600 may revert to step 604 at which a new Bayesian estimate may be formulated.

Next, if the outcome of decision step 608 is positive, then process 600 proceeds to step 610, and terminates.

Embodiments of the present invention include a system having one or more processing units coupled to one or more memories. The one or more memories may be configured to store software that, when executed by the one or more processing unit, allows practice of processes and embodiments described herein, including at least in FIG. 7, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term one or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to schedule an automated assignment of a new customer contact incoming to a contact center, comprising:
   determining, by a processor of the contact center, a characteristic of the new customer contact;
   determining, by the processor of the contact center, a characteristic of an existing customer contact being handled by a contact center agent;
   determining, by the processor of the contact center, a communication delay latency between an assignment engine and the contact center agent; and
   determining, by the processor of the contact center, an assignment time to assign the new customer contact to the contact center agent, wherein the assignment time is a predetermined amount of time in advance of a predicted time for receiving a ready indication from the contact center agent, the predetermined amount of time being determined from the communication delay latency, the characteristic of the new customer contact, and the characteristic of the existing customer contact.

2. The method of claim 1, wherein the characteristic of the existing customer contact comprises a probability distribution of a time until completion.

3. The method of claim 1, wherein the characteristic of the new customer contact comprises an estimate of an importance of the new customer contact.

4. The method of claim 1, wherein the characteristic of the new customer contact comprises an estimate of an importance of a customer associated with the new customer contact.

5. The method of claim 1, wherein determining the assignment time comprises determining a Bayesian estimate of when the existing customer contact will be completed.

6. The method of claim 1, wherein determining the assignment time comprises usage of confidence factors of an estimate.

7. The method of claim 1, further comprising:
   determining, by the processor of the contact center, a characteristic of the contact center agent; and
   determining, by the processor of the contact center, the assignment time based, at least in part, on the characteristic of the contact center agent.

8. The method of claim 1, further comprising:
   assigning, by the processor of the contact center, the new customer contact to the contact center agent at the predetermined amount of time in advance of receiving the ready indication from the contact center agent.

9. The method of claim 8, further comprising:
   reassigning, by the processor of the contact center, the new customer contact to the contact center agent unless an acknowledgement is received from the contact center agent within a different predetermined amount of time.

10. A system to schedule an automated assignment of a new customer contact incoming to a contact center, comprising:
    a processor;
    a memory in communication with the processor and storing executable instructions, the processor, when executing the executable instructions:
       determines a characteristic of the new customer contact;
       determines a characteristic of an existing customer contact being handled by a contact center agent;
       determines a communication delay latency between an assignment engine and the contact center agent;
       determines an assignment time to assign the new customer contact to the contact center agent, wherein the assignment time is a predetermined amount of time in advance of a predicted time for receiving a ready indication from the contact center agent, the predetermined amount of time being determined from the communication delay latency, the characteristic of the new customer contact, and the characteristic of the existing customer contact; and
       transmits the assignment of the new customer contact to the contact center agent at the determined assignment time.

11. The system of claim 10, wherein the characteristic of the existing customer contact comprises a probability distribution of a time until completion.

12. The system of claim 10, wherein the characteristic of the new customer contact comprises an estimate of an importance of the new customer contact.

13. The system of claim 10, wherein the characteristic of the new customer contact comprises an estimate of an importance of a customer associated with the new customer contact.

14. The system of claim 10, wherein the assignment time comprises a Bayesian estimate of when the existing customer contact will be completed.

15. The system of claim 10, wherein the assignment time comprises confidence factors of an estimate.

16. The system of claim 10, wherein the processor, when executing the executable instructions:
    determines a characteristic of the contact center agent,
    determines the assignment time to assign the new customer contact to the contact center agent based, at least in part, on the characteristic of the contact center agent.

17. The system of claim 10, wherein the processor, when executing the executable instructions:
    assigns the new customer contact to the contact center agent at the predetermined amount of time in advance of receiving the ready indication from the contact center agent.

18. The system of claim 17, wherein the processor, when executing the executable instructions:
    reassign the new customer contact to the contact center agent unless an acknowledgement is received from the contact center agent within a different predetermined amount of time.

19. The system of claim 10, wherein the communication delay latency is at least 0.5 seconds.

* * * * *